(12) United States Patent
Peek

(10) Patent No.: US 8,914,390 B2
(45) Date of Patent: Dec. 16, 2014

(54) REPETITIVE QUERY RECOGNITION AND PROCESSING

(75) Inventor: Daniel Nota Peek, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/181,388

(22) Filed: Jul. 12, 2011

(65) Prior Publication Data

US 2013/0018918 A1 Jan. 17, 2013

(51) Int. Cl.
*G06F 17/30* (2006.01)

(52) U.S. Cl.
CPC .............................. *G06F 17/30457* (2013.01)
USPC ........................................ 707/758; 707/721

(58) Field of Classification Search
USPC ................................................. 707/721, 758
See application file for complete search history.

(56) References Cited

U.S. PATENT DOCUMENTS

| | | | |
|---|---|---|---|
| 5,857,188 A | 1/1999 | Douglas | |
| 6,434,543 B1 | 8/2002 | Goldberg et al. | |
| 6,615,221 B2 | 9/2003 | Warner et al. | |
| 6,772,363 B2 | 8/2004 | Pedone et al. | |
| 6,801,919 B2 | 10/2004 | Hunt et al. | |
| 7,490,162 B1 | 2/2009 | Masters | |
| 8,069,469 B1 | 11/2011 | Atieh et al. | |
| 8,280,881 B1 * | 10/2012 | Zhou et al. ..................... | 707/728 |
| 2003/0204593 A1 | 10/2003 | Brown et al. | |
| 2004/0215746 A1 | 10/2004 | McCanne et al. | |
| 2006/0053065 A1 * | 3/2006 | Bowman et al. ................ | 705/26 |
| 2007/0061329 A1 | 3/2007 | Moutafov | |
| 2007/0226276 A1 * | 9/2007 | Suzuki et al. ................. | 707/204 |
| 2007/0239713 A1 * | 10/2007 | Leblang et al. .................... | 707/6 |
| 2008/0013702 A1 * | 1/2008 | Melideo ..................... | 379/93.17 |
| 2008/0033930 A1 * | 2/2008 | Warren ............................. | 707/5 |
| 2008/0320151 A1 | 12/2008 | McCanne et al. | |
| 2009/0138448 A1 * | 5/2009 | Barsness et al. .................. | 707/3 |
| 2009/0216718 A1 * | 8/2009 | Agrawal et al. ................... | 707/3 |
| 2010/0185649 A1 * | 7/2010 | Zhou et al. ..................... | 707/769 |
| 2010/0217793 A1 | 8/2010 | Preiss | |
| 2012/0254155 A1 * | 10/2012 | Heim et al. .................... | 707/721 |

OTHER PUBLICATIONS

Definition of "Match", from "The American Heritage College Dictionary".*
Wester, et al., "Tolerating latency in replicated state machines through client speculation", NSDI '09: 6th USENIX Symposium on Networked Systems Design and Implementation, 2009, pp. 245-260, 2009.
Nightingale, et al., "Rethink the Sync", 14 pages, 2006.
Nightingale, et al. "Speculative Execution in a Distributed File System", 15 pages, Oct. 26, 2005.
USPTO, *Office Action*, U.S. Appl. No. 13/181,416, filed Jul. 12, 2011, in re:Daniel Nota Peek; (22 pgs), Apr. 1, 2013.
USPTO, *Office Action*, U.S. Appl. No. 13/181,396, filed Jul. 12, 2011, in re:Daniel Nota Peek; (11 pgs), Jun. 3, 2013.
*USPTO Non-Final Office Action* for U.S. Appl. No. 13/181,405, 9 pages, Sep. 9, 2013.
*USPTO Final Office Action* for U.S. Appl. No. 13/181,416, 12 pages, Sep. 11, 2013.

* cited by examiner

*Primary Examiner* — Mahesh Dwivedi
(74) *Attorney, Agent, or Firm* — Baker Botts L.L.P.

(57) ABSTRACT

Processing repetitive database queries may include receiving a database query having a connection identifier, determining whether a queue for database queries contains an earlier database query matching the received database query, identifying the second database query as matching the first database query if the queue contains an earlier matching database query, receiving query results for the earlier matching database query from a database server, and forwarding query results to the clients associated with both database queries using corresponding connection identifiers.

17 Claims, 4 Drawing Sheets

REPETITIVE QUERY RECOGNITION AND PROCESSING

TECHNICAL FIELD

The present disclosure generally relates to databases and, more particularly to repetitive database query recognition and processing.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view web pages created or customized by other users where visibility and interaction with such pages by other users is governed by some characteristic set of rules.

Such social networking information may be stored in relational databases. Generally, a relational database is a collection of relations (frequently referred to as tables). Relational databases use a set of mathematical terms, which may use Structured Query Language (SQL) database terminology. For example, a relation may be defined as a set of tuples that have the same attributes. A tuple usually represents an object and information about that object. A relation is usually described as a table, which is organized into rows and columns. Generally, all the data referenced by an attribute are in the same domain and conform to the same constraints.

The relational model specifies that the tuples of a relation have no specific order and that the tuples, in turn, impose no order on the attributes. Applications access data by specifying queries, which use operations to identify tuples, identify attributes, and to combine relations. Relations can be modified and new tuples can supply explicit values or be derived from a query. Similarly, queries may identify tuples for updating or deleting. It is necessary for each tuple of a relation to be uniquely identifiable by some combination (one or more) of its attribute values. This combination is referred to as the primary key. In a relational database, all data are stored and accessed via relations. Relations that store data are typically implemented with or referred to as tables.

Relational databases, as implemented in relational database management systems, have become a predominant choice for the storage of information in databases used for, for example, financial records, manufacturing and logistical information, personnel data, and other applications. As computer power has increased, the inefficiencies of relational databases, which made them impractical in earlier times, have been outweighed by their ease of use for conventional applications. The three leading open source implementations are MySQL, PostgreSQL, and SQLite. MySQL is a relational database management system (RDBMS) that runs as a server providing multi-user access to a number of databases. The "M" in the acronym of the popular LAMP software stack refers to MySQL. Its popularity for use with web applications is closely tied to the popularity of PHP (the "P" in LAMP). Several high-traffic web sites use MySQL for data storage and logging of user data.

Using databases involves a series of messages that enable a database user to interact with a database. For example, a database transaction may involve messaging associated with setting up connections to a database, authentication, querying the database, switching databases, committing transactions to the database, and terminating connections with the database.

SUMMARY

In accordance with the present disclosure, disadvantages and problems associated with repetitive database query processing may be reduced or eliminated.

According to one embodiment, processing repetitive database queries includes receiving a database query having a connection identifier, determining whether a queue for database queries contains an earlier database query matching the received database query, identifying the second database query as matching the first database query if the queue contains an earlier matching database query, receiving query results for the earlier matching database query from a database server, and forwarding query results to the clients associated with both database queries using corresponding connection identifiers.

DESCRIPTION OF EXAMPLE EMBODIMENTS

The present disclosure is now described in detail with reference to a few embodiments thereof as illustrated in the accompanying drawings. In the following description, numerous details are set forth in order to provide a thorough understanding of the present disclosure. However, the present disclosure may be practiced without some or all of these details. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1A:
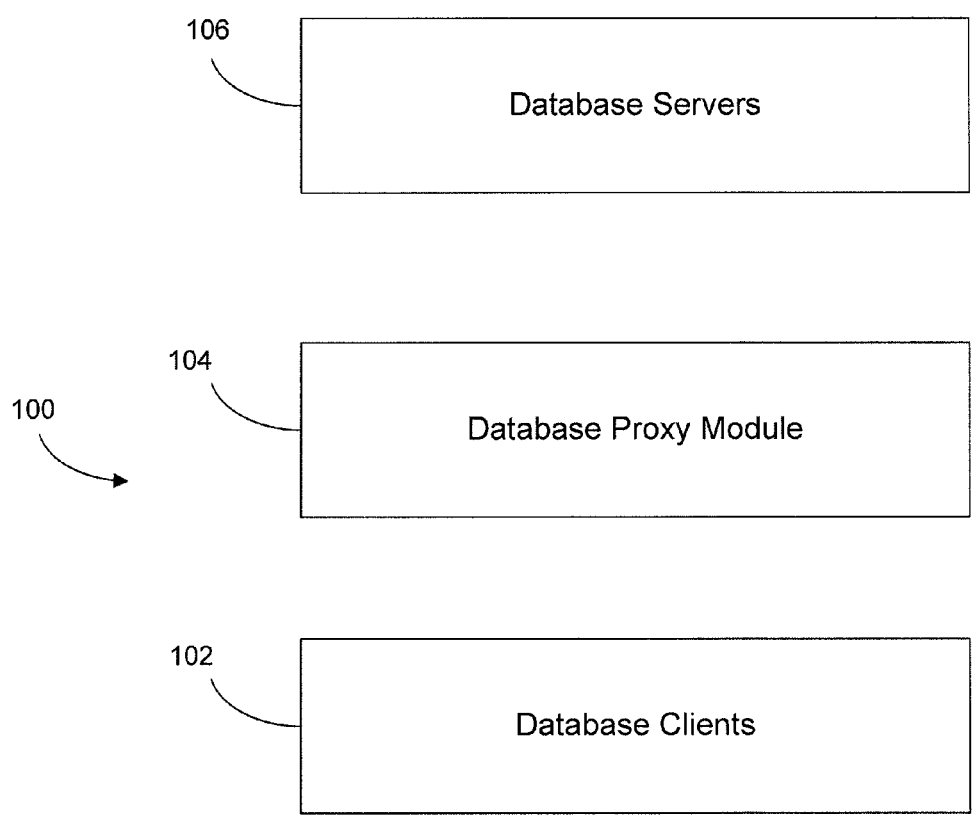
FIG. 1A illustrates example devices involved in a database transaction.

FIG. 1A illustrates a system 100 of example components involved in a database transaction. As illustrated, system 100 includes database clients 102, a database proxy module 104, and database servers 106. In appropriate environments, these components interoperate to facilitate database transactions between database clients 102 and a database server 106. For example, database clients 102 may transmit and receive messages from database server 106 using database proxy module 104, and thereby access, retrieve, and store information in a database residing on database server 106. The database proxy module 104 may facilitate and assist in the processing of database transactions between database clients 102 and database servers 106. In particular embodiments, database proxy module 104 is operable to recognize repetitive queries to database servers 106 and process them in a manner that conserves resources. In other embodiments, the recognition and processing of repetitive queries may take place on database servers 106.

Figure 1B:
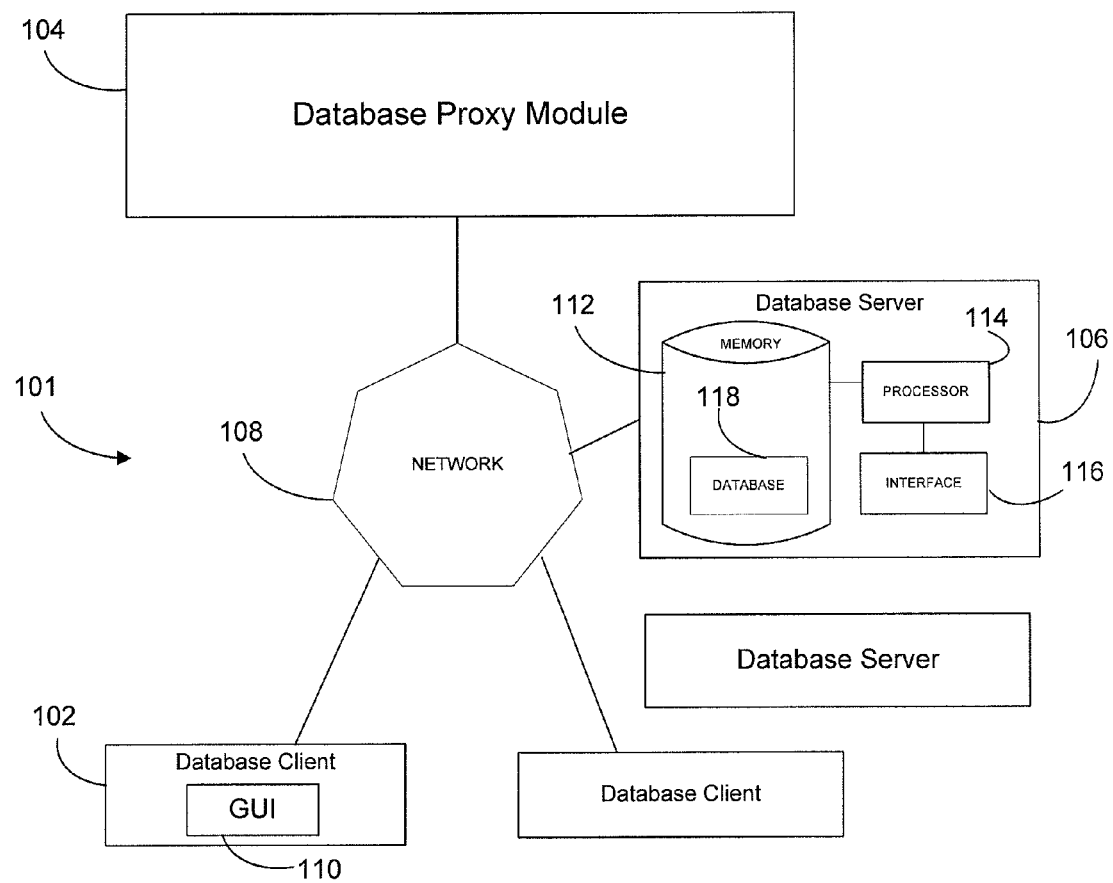
FIG. 1B illustrates an example database environment.

FIG. 1B illustrates a system 101 of an example database environment in which embodiments of the present disclosure may operate. In the illustrated embodiment, system 101 may recognize and process repetitive queries to a database. In particular embodiments, a repetitive query refers to a database query that has the same connection identifier and identifies a query to the same database as a pending database query. For example, database servers 106 and/or database proxy module 104 may have queues of database queries which are processed one at a time. While a database query is awaiting results from a database or is awaiting its turn to be processed off of the queue, database servers 106 and/or database proxy module 104 may receive a substantially similar database request. In particular, a new database request may specify the same database and have the same connection identifier as a pending database query. In certain embodiments, a connection identifier specifies a particular database client of database clients 102 or one of potentially many communication sessions with a database client. In some embodiments, a database client 102 may have multiple database connections and each database connection has a connection identifier. The illustrated system 101 facilitates recognition and processing of such repetitive database queries in a manner that is efficient and avoids unnecessary processing of a substantially similar database query.

Database clients 102 represent computer systems including appropriate hardware, control logic, and data that may be used to interface with other system components, such as database proxy module 104 or database servers 106, using network 108. For example, database clients 102 may represent web servers, mainframe computers, workstations, laptops, netbooks, tablet computers, personal data assistants, (PDAs), mobile phones, mainframes, and any other suitable computing device capable of interacting with a database using appropriate messaging and/or database transactions. Database clients 102 may support a wide array of operations, including but not limited to, web browsing, word processing, querying databases, and processing results retrieved from databases. According to particular embodiments, database clients 102 may provide access, potentially through web-based interfaces, to information managed by other elements such as database proxy module 104 and database servers 106. As illustrated, database clients 102 may include a graphical user interface 110. Graphical user interface 110 represents any appropriate interface for receiving and displaying information to a user of system 100. Graphical user interface 110 may be any appropriate combination of hardware and/or software to facilitate a user's interaction with database clients 102. In particular embodiments, database clients 102 are web servers that issue a series of database requests in order to deliver web pages to requesting network users. For example, a social networking user may request that a web server deliver a web page associated with another social networking user. In such an example, the web server may issue a number of database queries to populate the requested web page with relevant information. In some embodiments, the database queries issued by database clients 102 to database servers 106 may contain duplicates. In those instances, repetitive database queries may be processed according to embodiments of the present disclosure.

Network 108 represents any suitable communications network operable to facilitate communication between the components of system 101, such as database clients 102, database servers 106, and database proxy module 104. Network 108 may include any interconnecting system capable of transmitting audio/video signals, data, messages or any other combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between components of system 101. Network 108 may include any combination of gateways, routers, hubs, switches, access points, base stations, wireless telephone systems and any other hardware, software or combination thereof.

Database proxy module 104 represents suitable hardware components, control logic, and data for processing database transactions to and from database servers 106 and database clients 102. As illustrated, database proxy module 104 may be communicatively coupled to other components of system 101, such as database servers 106 and database clients 102, by a network 108. Database proxy module 104 may receive database queries from database clients 102, place them in a queue for ordered processing, forward each query to a particular database server of database servers 106, receive the results from each query, and forward the results to appropriate database clients 102. In particular embodiments, database proxy module 104 may be operable to recognize and process repetitive database queries by database clients 102. Database proxy module 104 will be discussed in further detail in FIG. 2.

Database servers 106 represent suitable hardware components, control logic, and data for managing information in one or more databases. For example, database servers 106 may be any suitable combination of computer servers and networking devices, whether real or virtual. In particular embodiments, database servers 106 may manage data associated with a social networking website. For example, database servers 106 may manage data corresponding to users of a social networking website in the form of text, audio, video, and images. Database servers 106 may also retain information including configurations, settings, rules and policies associated with the managed data and/or particular users or groups. Database servers 106 may employ one or more relational databases for storing various types of information in a manner that is accessible and easily retrievable upon request. In certain embodiments, database servers 106 are operable to perform repetitive query recognition and processing.

As illustrated, database servers 106 may include various interconnected elements including a memory 112, a processor 114, and an interface 116. Memory 112 represents any suitable combination of volatile or non-volatile, local or remote devices suitable for storing information. For example, memory 112 may include random access memory (RAM), read only memory (ROM), magnetic storage devices, optical storage devices, or any other suitable information storage device or a combination of such devices. Memory 112 may maintain appropriate control logic and rules for controlling the operation of database servers 106. As illustrated, memory 112 may include a database 118 for storing and organizing various types of data. In particular embodiments, database 118 represents a relational database for storing information, such as social networking information, in an easily retrievable format. For example, database 118 may represent a SQL database for storing various types of information.

Processor 114 represents any hardware and/or software that communicatively couples to memory 112 and interface 116, and controls the operation and administration of database servers 106. For example, processor 114 may execute appropriate software to control the operation of database servers 106. Processor 114 may be a programmable logic device, a microcontroller, a microprocessor, any other appropriate processing device, or any suitable combination of the preceding.

Interface 116 represents any suitable device operable to receive information from network 108, transmit information through network 108, perform processing of received or transmitted information, communicate to other devices or any combination of the preceding. Interface 116 represents any port or connection, real or virtual including any suitable hardware and/or software including protocol conversion and data processing capabilities to communicate through a LAN, WAN or other communication systems that allow database servers 106 to exchange information with network 108, database clients 102 and database proxy module 104. For example, interface 116 may receive requests for database transactions associated with database 118 from database clients 102. According to particular embodiments, interface 116 may receive database queries from database clients 102 and/or database proxy module 104, for appropriate processing by processor 114 of the information stored in database 118 of memory 112.

In certain embodiments, database proxy module 104 maintains a pool of database connections between itself and one or more database servers located at one or more database servers 106. According to particular implementations, the database connections may be in an active or idle states with respect to particular databases at database servers 106. In particular embodiments, database proxy module 104 may harness a pool of database connections, as appropriate, to process and respond to database transactions received from database clients 102. For example, database proxy module 104 may multiplex database transactions received from different database clients 104 onto a particular database connection selected from the pool of database connections existing between database proxy module 104 and database servers 106. Thus, particular embodiments of the present disclosure facilitate using database connection pooling to improve the performance of database transactions.

In exemplary embodiments, database proxy module 104 receives database queries from database clients 102, processes those queries to identify repetitive database queries, receive database results from database servers 106, and forward those database results to the appropriate database clients 102. In other embodiments, database servers 106 are operable to identify repetitive database queries and forward those database results to the appropriate database clients. In order to process repetitive database queries, certain embodiments may tag earlier versions of the same database query and log the connection identifier associated with the new but similar database query. A connection identifier may include a user identifier, a session identifier, and/or database identifiers. Accordingly, database clients 102, database proxy module 104, and database servers 106 may work in conjunction to recognize and appropriately process repetitive database queries, thereby conserving computing resources and minimizing transaction delays.

A component of systems 100 and 101 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and 101 and the components within systems 100 and 101.

While systems 100 and 101 are illustrated as including specific components arranged in a particular manner, it should be understood that various embodiments may operate using any suitable arrangement and collection of components capable of performing functionality such as that described. For example, a database server 106 may also be database proxy module 104.

Figure 2:
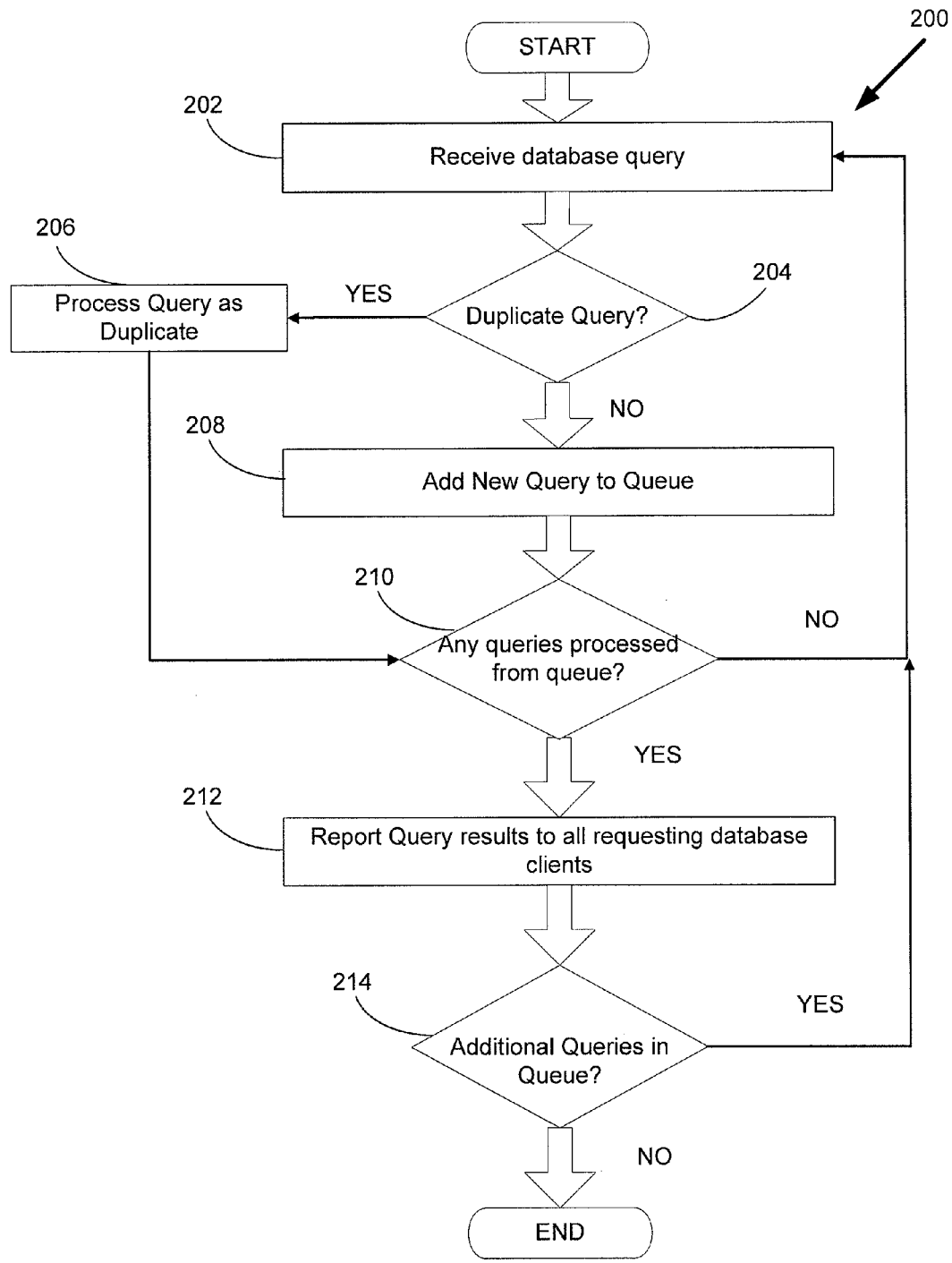
FIG. 2 illustrates a flowchart of an example embodiment.

FIG. 2 is a process flow diagram illustrating an example process flow 200 for recognizing repetitive database queries and processing them in a manner that avoids resending a database request that is identical to a pending database request. As illustrated, process flow 200 begins at step 202 where database proxy module 104 receives an initial database query. A database query may include a connection identifier that specifies parameters associated with a specific database query such as the user, the specific database requested, and/or the session identifier. Next, at step 204, a database proxy module 104 may determine whether the received database query matches another database query that is currently being processed, or residing on a queue waiting to be processed. As shown, if a duplicate query is found, database proxy module processes the query as a duplicate in step 206. In particular embodiments, processing a duplicate query may involve identifying the earlier pending database query in the queue and associating the query with the connection identifier corresponding to the received database query. Such processing of the duplicate database query enables database proxy module 104 to identify all the users associated with this particular database query to facilitate forwarding of the database results to all such users once corresponding database results are received. If, however, no duplicate query is found, the new query is added to the processing queue in step 208. Particular embodiments of the present disclosure use a queue to handle database requests when they are received by database proxy module 104 while a database query or other database transaction is pending with database servers 106. A queue may facilitate ordering and implement levels of priority associated with various queries or other database transactions.

After a database query is processed as a duplicate in step 206 or the database query is added to the queue in step 208, database proxy module 104 determines, at step 210, whether any queries have been processed from the queue. In particular embodiments, this step may involve receiving one or more database results corresponding to previous database queries issued to database servers 106. In such embodiments, when database results are received, database proxy module 104 may report the query results to all requesting database clients 102. In certain embodiments, this may involve reporting the query results not only to the database client 102 who initiated the first database request but also any database client 102 associated with database requests that were previously processed as duplicates in step 206. Accordingly, database proxy module 104 may communicate one set of database results to multiple database clients 102. Database proxy module 104 may determine which database clients 102 to report the query results to by referring to the connection identifier, which may uniquely identify the appropriate database client 102. Next, as illustrated in step 214, database proxy module 104 determines whether additional queries are in the queue. If additional queries do exist in the queue, process 200 proceeds to step 202 to repeat the aforementioned steps in order to recognize and process additional database queries that may be substantially similar to database queries already in the queue or pending processing by a database server 106.

In some embodiments, the steps of process flow 200 may be divided into separate process flows. For example, one process flow may perform steps similar to steps 202-208, to receive queries from database clients 102, identify duplicate queries, and/or place received queries on the queue. A second process flow may perform steps similar to steps 210-214 to determine whether query results have been received from database servers 106 and report any such results to one or more requesting database clients 102. In certain implementations, these separate processes may operate substantially in parallel to one another to receive and process queries from database clients 102 (regardless of whether duplicates exist), while database results are received from database servers 106, processed, and reported to the one or more requesting database clients 102.

While process flow 200 is described as being performed at a database proxy module 104, each of the steps of process flow 200 may be performed at one or more database servers 106 or any other suitable computer server. While process flow 200 is illustrated as including specific steps arranged in a particular sequence, it should be understood that various embodiments may operate using any suitable arrangement and collection of steps capable of performing functionality such as that described.

Figure 3:
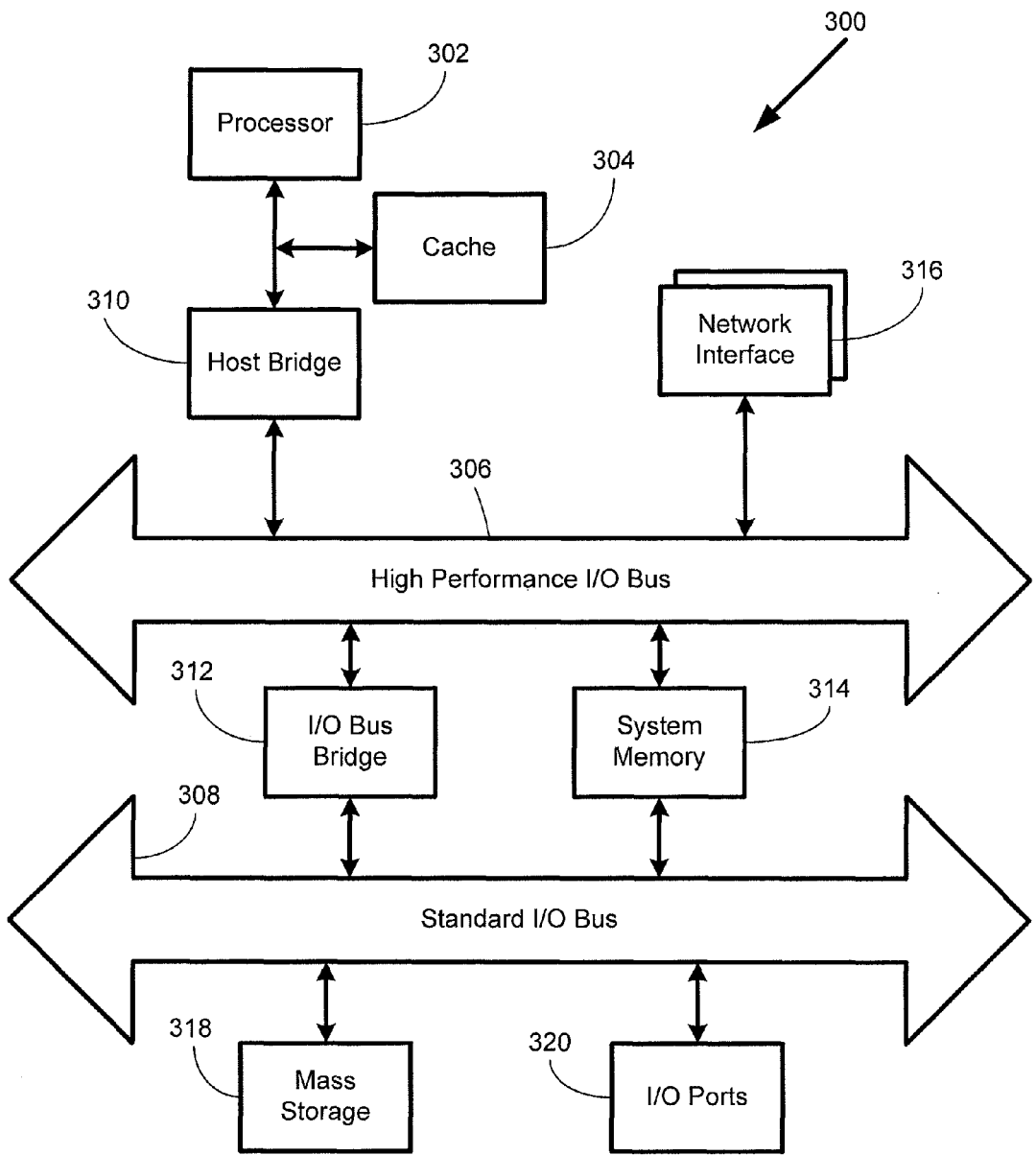
FIG. 3 illustrates an example computer system.

FIG. 3 illustrates an example computer system 300. In particular embodiments, computer system 300 is a computer server that runs all or part of a functionality related to a repetitive query recognition and processing system. In particular embodiments, computer system 300 may represent the hardware architecture of database clients 102, database proxy module 104, and/or database servers 106. In one embodiment, hardware system 300 includes a processor 302, a cache memory 304, and one or more software applications and drivers directed to the functions described herein. Additionally, hardware system 300 includes a high performance input/output (I/O) bus 306 and a standard I/O bus 308. A host bridge 310 couples processor 302 to high performance I/O bus 306, whereas I/O bus bridge 312 couples the two buses 306 and 308 to each other. A system memory 314 and a network/communication interface 316 couple to bus 306. Hardware system 300 may further include video memory (not shown) and a display device coupled to the video memory. Mass storage 318 and I/O ports 320 couple to bus 308. In one embodiment, hardware system 300 may also include a keyboard and pointing device 322 and a display 324 coupled to bus 308. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 300 are described in greater detail below. In particular, network interface 316 provides communication between hardware system 300 and any of a wide range of networks, such as an Ethernet (e.g., IEEE 802.3) network. Mass storage 318 provides permanent storage for the data and programming instructions to perform the functions described herein, whereas system memory 314 (e.g., DRAM) provides temporary storage for the data and programming instructions when executed by processor 302. I/O ports 320 are one or more serial and/or parallel communication ports that provide communication between additional peripheral devices, which may be coupled to hardware system 300.

Hardware system 300 may include a variety of system architectures; and various components of hardware system 300 may be rearranged. For example, cache 304 may be on-chip with processor 302. Alternatively, cache 304 and processor 302 may be packed together as a "processor module," with processor 302 being referred to as the "processor core." Furthermore, certain embodiments of the present disclosure may not require nor include all of the above components. For example, the peripheral devices shown coupled to standard I/O bus 308 may couple to high performance I/O bus 306. In addition, in some embodiments only a single bus may exist with the components of hardware system 300 being coupled to the single bus. Furthermore, hardware system 300 may include additional components, such as additional processors, storage devices, or memories.

In particular embodiments, repetitive query recognition and processing system, as well as other computer-implemented operations described herein includes a series of software routines run by hardware system 300. These software routines include a plurality or series of instructions to be executed by a processor in a hardware system, such as processor 302. Initially, the series of instructions are stored on a storage device, such as mass storage 318. However, the series of instructions can be stored on any suitable storage medium, such as a diskette, CD-ROM, ROM, or EEPROM. Furthermore, the series of instructions need not be stored locally, and could be received from a remote storage device, such as a server on a network, via network/communication interface 316. The instructions are copied from the storage device, such as mass storage 318, into memory 314 and then accessed and executed by processor 302.

An operating system manages and controls the operation of hardware system 300, including the input and output of data to and from software applications (not shown). The operating system provides an interface between the software applications being executed on the system and the hardware components of the system. According to one embodiment of the present disclosure, the operating system is the LINUX operating system. However, embodiments of the present disclosure may be used with other suitable operating systems, such as the Windows® 95/98/NT/XP/Vista/7 operating system, available from Microsoft Corporation of Redmond, Wash., the Apple Macintosh Operating System, available from Apple Computer Inc. of Cupertino, Calif., UNIX operating systems, and the like.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A non-transitory computer readable medium comprising instructions, the instructions operable when executed by a processor to:
receive a second database query comprising a second connection identifier, the second connection identifier comprising a user identifier, a session identifier, and a database identifier;
determine whether a queue for unexecuted database queries contains a first database query comprising a first connection identifier, the first connection identifier comprising a user identifier, a session identifier, and a database identifier, wherein the user identifier, the session identifier, and the database identifier of the first connection identifier are the same as the user identifier, the session identifier, and the database identifier of the second connection identifier;

if the queue contains the first database query, identify the second database query as being a duplicate of the first database query;

receive one set of query results for the first database query from a database server; and forward the set of query results to both a first client associated with the first connection identifier and a second client associated with the second connection identifier.

2. The non-transitory computer readable medium of claim 1, wherein the instructions are further operable when executed by the processor to, if the queue does not contain the first database query, add the second database query to the queue.

3. The non-transitory computer readable medium of claim 1, wherein identifying the received database query as being a duplicate of the first database query comprises associating the first database query in the queue with the second connection identifier.

4. The non-transitory computer readable medium of claim 1, wherein the instructions are further operable when executed by the processor to:

receive query results for a third database query, wherein the third database query comprises a third connection identifier;

forward the query results to a third client associated with the third connection identifier.

5. The non-transitory computer readable medium of claim 1, wherein the first client and the second client are web servers.

6. The non-transitory computer readable medium of claim 1, wherein the database server is a Structured Query Language (SQL) database.

7. An apparatus comprising:

an interface operable to receive unexecuted database queries;

a memory operable to store one or more of the received unexecuted database queries in a queue;

a processor communicatively coupled to the interface and the memory, the processor operable to:

receive a second database query comprising a second connection identifier from the interface, the second connection identifier comprising a user identifier, a session identifier, and a database identifier;

determine whether the queue contains a first database query comprising a first connection identifier, the first connection identifier comprising a user identifier, a session identifier, and a database identifier, wherein the user identifier, the session identifier, and the database identifier of the first connection identifier are the same as the user identifier, the session identifier, and the database identifier of the second connection identifier;

if the queue contains the first database query, identify the second database query as being a duplicate of the first database query;

receive one set of query results for the first database query from a database server; and forward the set of query results to both a first client associated with the first connection identifier and a second client associated with the second connection identifier.

8. The apparatus of claim 7, wherein the processor is further operable to, if the queue does not contain the first database query, add the second database query to the queue.

9. The apparatus of claim 7, wherein identifying the received database query as being a duplicate of the first database query comprises associating the first database query in the queue with the second connection identifier.

10. The apparatus of claim 7, wherein the instructions are further operable when executed by the processor to:

receive query results for a third database query, wherein the third database query comprises a third connection identifier;

forward the query results to a third client associated with the third connection identifier.

11. The apparatus of claim 7, wherein the first client and the second client are web servers.

12. The apparatus of claim 7, wherein the database server is a Structured Query Language (SQL) database.

13. A method, comprising:

receiving a second database query comprising a second connection identifier, the second connection identifier comprising a user identifier, a session identifier, and a database identifier;

determining whether a queue for unexecuted database queries contains a first database query comprising a first connection identifier, the first connection identifier comprising a user identifier, a session identifier, and a database identifier, wherein the user identifier, the session identifier, and the database identifier of the first connection identifier are the same as the user identifier, the session identifier, and the database identifier of the second connection identifier;

if the queue contains the first database query, identifying the second database query as being a duplicate of the first database query;

receiving one set of query results for the first database query from a database server; and forwarding the set of query results to both a first client associated with the first connection identifier and a second client associated with the second connection identifier.

14. The method of claim 13, further comprising if the queue does not contain the first database query, adding the second database query to the queue.

15. The method of claim 13, wherein identifying the received database query as being a duplicate of the first database query comprises associating the first database query in the queue with the second connection identifier.

16. The method of claim 13, further comprising:

receiving query results for a third database query, wherein the third database query comprises a third connection identifier;

forwarding the query results to a third client associated with the third connection identifier.

17. The method of claim 13, wherein the first client and the second client are web servers.

* * * * *